Jan. 26, 1965   H. P. BOVENKERK   3,167,159
INSULATING STRUCTURES WITH VARIABLE THERMAL
CONDUCTIVITY AND METHOD OF EVACUATION
Filed July 30, 1959                                  2 Sheets-Sheet 2
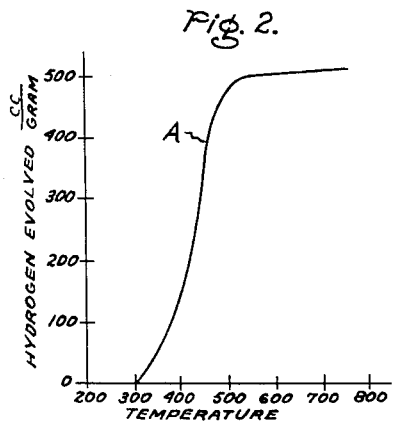
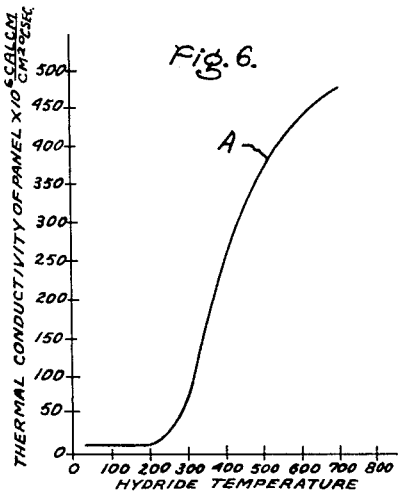
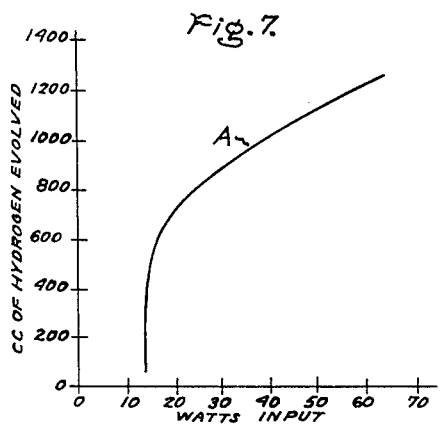
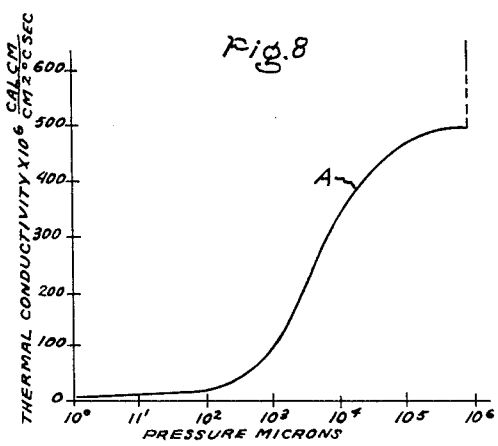
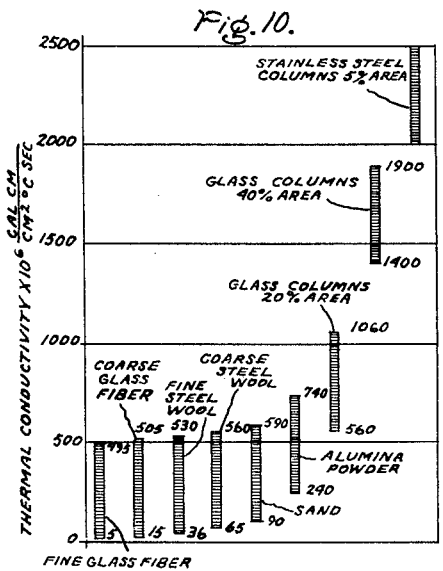
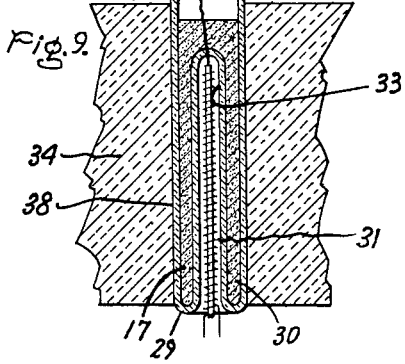
Inventor:
Harold P. Bovenkerk,
by James J. Lichiello
His Attorney.

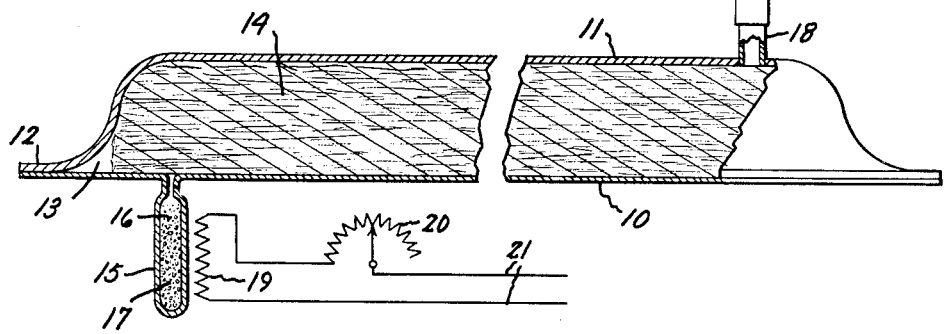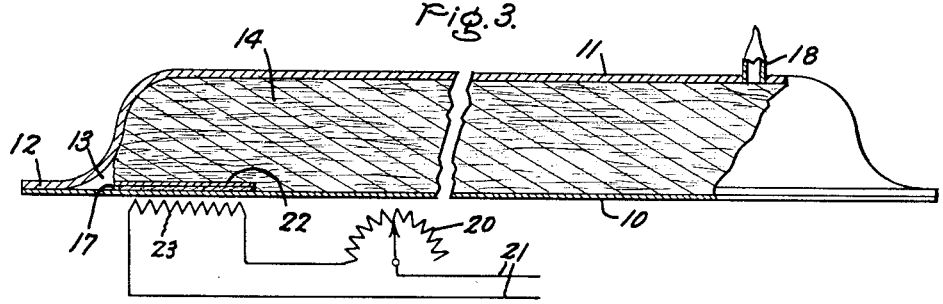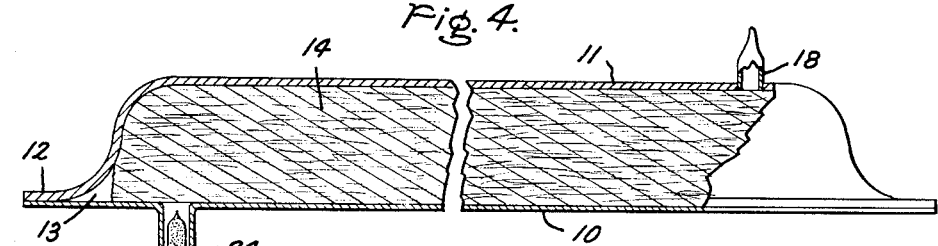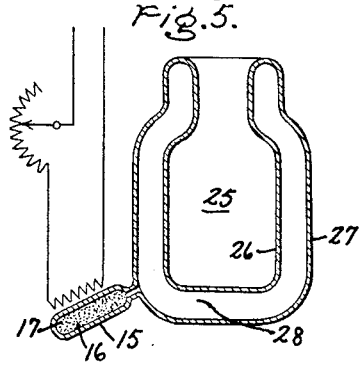

United States Patent Office 3,167,159
Patented Jan. 26, 1965

3,167,159
INSULATING STRUCTURES WITH VARIABLE THERMAL CONDUCTIVITY AND METHOD OF EVACUATION
Harold P. Bovenkerk, Royal Oak, Mich., assignor to General Electric Company, a corporation of New York
Filed July 30, 1959, Ser. No. 830,510
9 Claims. (Cl. 189—34)

This invention is a continuation-in-part of copending application S.N. 452,662, filed August 27, 1954, H. P. Bovenkerk, Insulating Structures, now abandoned and assigned to the same assignee as the present invention.

This invention relates to thermal insulating structures and more particularly to the evacuation of thermal insulating structures and varying the thermal conductivity thereof.

One well known type of thermal insulating means generally comprises a hermetically sealed, evacuated structure or container generally defined by a pair of spaced apart walls joined together at their periphery. The defined space in these structures may be filled with a suitable filler material, for example, silica gel, glass fiber insulation, and various other well known filler materials, to support the walls against external atmospheric pressure when the space between the walls is evacuated. Thermal insulating structures of the aforesaid type including a fiber glass insulation filler may be made in accordance with the invention of H. M. Strong and F. P. Bundy, S.N. 750,549, filed July 17, 1958, now abandoned and assigned to the General Electric Company, the assignee of the present invention. The aforementioned application related to fiber glass strands as a filler material, the strands being oriented in planes parallel to the containing walls to provide long and tortuous paths for heat conductivity. The strands vary in diameter and the range employed being about .00001 to .002 inch. The space is evacuated to a pressure of about 10 mm. of mercury.

It is desirable for the long-term maintenance of the thermal insulating properties of such insulating structure or panels, that absorbed gases, for example, water vapor and carbon dioxide, be baked off and evacuated therefrom prior to sealing the panels. However, in the evacuation of such insulating panels, the closely packed and small diameter fiber or other filler material offers a very high impedance to the movement of gas molecules for proper evacuation and, therefore, evacuation procedures generally require not only high temperatures for the bake-off period, but extensive evacuation over long periods of time to remove the gases present, absorbed or evolved, for the required evacuation pressure. In many instances, however, due to the economics of the situation, or to the type of filler material utilized, the extensive period of time is undesirable, or the high temperatures may be injurious to the filler material. It is, therefore, a distinct advantage to have a means of evacuating a panel which would require lower and more economical temperatures and a much shorter and more economical evacuation time, with the combination providing the extreme low pressures desired in evacuated thermal insulating structures or panels. After the panel has been evacuated, some gases may continue to leak into the panel, or the filler material or the wall material may evolve gases or hydrogen gas for example, may diffuse from the outside through the metal of the panel walls and into the interior of the insulating structure. Therefore, it is also desirable to have some means within the panel to absorb these gases to maintain the evacuated panel at its predetermined pressure.

After a panel or other structure is assembled, whether the panel be in rectangular panel form, a curved, or a form defining a general container form, it generally conforms to a specific or predetermined conductivity or K value. This conductivity may be stated as calories per centimeter per degree centigrade per second, and the mathematical expression for which is $$K = \frac{QD}{A \Delta T}$$

In this expression, Q is the amount of heat in calories per second which crosses an area A through a distance D under the influence of a temperature difference $\Delta T$. Any change or variation of the K value for a given panel is generally a result of some failure of the panel itself, and panels are usually employed to substantially prevent the transfer of heat through the spaced apart walls. There are many applications, however, where there is a need for a panel having variable conductivity, such that the conditions within an insulating structure or container may be maintained over wide ranges of temperatures. It may be desired, for example, to permit the temperature within a structure having insulating walls to be raised by ambient conditions under certain circumstances, and to prevent heat loss under lower ambient conditions and other circumstances. Such changeable, regulated, or variable conductivity may be employed, for example, within predetermined time and temperature limits. By means of this invention, the combination of the method of evacuating a chamber and the method or apparatus utilized to regulate the K value may be integrated or combined.

Accordingly, it is an object of this invention to provide an improved method of evacuating filler filled insulating structures.

It is another object of this invention to provide an improved method of evacuating a filler filled insulating structure by utilizing a separate gas to sweep through the structure.

It is another object of this invention to provide an improved means of evacuating an insulating structure wherein the means include, a remaining material in the structure to continuaully absorb diffused gases.

It is a further object of this invention to provide an insulating structure having variable thermal conductivity.

It is another object of this invention to provide an insulating structure of the evacuated type with variable thermal conductivity.

It is still another object of this invention to provide an evacuated filler filled insulating panel having variable thermal conductivity.

It is yet another object of this invention to provide a gas releasing and absorbing agent within an evacuated filler filled panel to provide variable conductivity through heat transfer by gaseous conduction.

It is still another object of this invention to provide controlled means external to the panel to control the conductivity of the panel.

In carrying out this invention in one form, a gas releasing and absorbing hydride is enclosed in a thermal insulating structure of the vacuum type together with heating means, to facilitate the evacuation of the structure by the release of the gas in the structure during the evacuation process, and to provide a control for varying the thermal conductivity of the structure.

These and other objects, features and advantages of the invention will be better understood from the following description taken in connection with the accompanying drawings in which:

FIG. 1 is a sectional view of a thermal insulating panel or structure having a hydride in communication with the interior thereof;

FIG. 2 is a curve illustrating hydrogen evolved from titanium hydride with respect to temperature;

FIG. 3 is a modified form of the sectional view of the invention of FIG. 1 illustrating an alternate method of placing a gas adsorbing hydride in communication with the interior of a thermal insulating structure;

FIG. 4 is a further modification of the invention of FIG. 1 illustrating a modification of the hydride container;

FIG. 5 is a sectional view of a further modified form of a thermal insulating structure;

FIG. 6 is a curve illustrating the change of conductivity K with respect to the temperature of the hydride;

FIG. 7 is a curve illustrating the amount of hydrogen evolved from 4 grams of titanium hydride with respect to wattage input to the heater of FIG. 1;

FIG. 8 is a curve illustrating the change in conductivity with respect to hydrogen gas pressure;

FIG. 9 is a modified form of an appendage containing a metal hydride, and the heating means therefor, and FIG. 10 is a graphic representation of the conductivity range of flat panels with various fillers.

Referring now to FIG. 1 of the drawings, one form of a thermal insulating panel is shown which comprises a wall 10 of a thin flexible sheet of material of relatively low thermal conductivity, such as for example, stainless steel, and a second wall 11 of a thin flexible sheet of material such as for example, low carbon steel. In any insulating panel the thermal conductivity of either or both walls, in the preferred form, should have as low a thermal conductivity as possible. Walls 10 and 11 are joined at their edges 12 by welding or other suitable well known joining means to provide a space 13 therebetween. Space 13 is filled with a body of filler material 14, such as for example, glass fiber insulation to provide support for the walls 10 and 11 against the external atmospheric pressure when the space 13 is evacuated. A suitable appendage member 15 extends from wall 10 to define a chamber 16 which is in communication with space 13. Appendage member 15 is preferably composed of glass, quartz, or metal, although it is understood that various other materials may be utilized. Chamber 16 is filled with a hydride 17, for example, the metallic hydrides of titanium, zirconium, uranium, cerium, barium etc., to name a few of the more notable varieties. An evacuation port 18 is provided on wall 11 adjacent the opposite end of the panel from the appendage member 15. Evacuation port 18 is suitably connected by a connecting member 20 to evacuating means, not shown, to evacuate the space 13.

In the evacuation of a large glass fiber filled panel, for example, the close packed fibers offer a very high impedance to the motion of the gases existing in the panel or the evolved gases from the filler material or the panel structure when low vacuum pressures are reached. If a source of a light gas, for example, hydrogen is swept through the panel during the evacuation thereof, the increased number of molecular collisions between hydrogen molecules and panel gas molecules accelerates the evacuation. Hydrogen is a particularly good gas to employ during the evacuation since its rate of diffusion is the highest of known gases and it is not appreciably absorbed by the panel elements at normal bake-out temperatures. Other gases may, however, be employed for particular conditions and circumstances.

The choice of a suitable hydride is dependent upon a particular hydride which will release substantial amounts of hydrogen at reasonable temperatures. While certain compounds of non-metals exist in which hydrogen seems to play the role of being able to release and absorb large amounts of hydrogen, it has been found that the more suitable hydrides are those of the metallic variety which are believed to represent the most suitable source of hydrogen. The metallic hydrides do not decompose significantly when they are heated to temperatures below about 350° C., but large quantities of hydrogen are evolved generally above this temperature. In the temperature range of 350° C. to 700° C., such hydrides are very sensitive as to whether hydrogen gas is evolved or absorbed when they are heated in a pure hydrogen atmosphere.

In FIG. 2 curve A illustrates the amount of hydrogen which is evolved from titanium hydride when heated to temperatures in excess of about 350° C. FIG. 2 also illustrates the quantity of evolved hydrogen in relation to the quantity of hydride. It may be seen that this material is a desirable one since, only a small quantity is necessary, and curve A is reversible.

The activated metallic hydrides are hydrogen absorbers or getters at room temperature. Such hydrides will absorb hydrogen after decomposition in vacuum at a temperature in excess of about 350° C. However, after decomposition a vacuum or inert gas atmosphere must be maintained to provide an effective hydrogen getter. A decomposed source of metallic hydride will attempt to absorb gases, particularly hydrogen, immediately after being decomposed or exposed to the atmosphere from which they are desired to absorb various gases. The curve of FIG. 2 may be described as being reversible to show hydrogen absorption.

In the assembly of an exemplary panel structure, which is shown in FIG. 1, a metallic hydride 17, for example titanium hydride, is provided in the appendage member 15 of wall 10. Filler material 14 is positioned between walls 10 and 11 which are then joined at their edges 12 by welding. The evacuation port 18 is then connected to a vacuum system, not shown, by tube 20 and the panel is baked out and evacuated in an oven, not shown. Heretofore, the general method of evacuation necessitated a bake-out temperature of at least 350° in order to provide a proper evacuation of the gases in the panel, and evolved gases. Even at this temperature, the evacuation process generally requires a prolonged period of time because of the impedance of the gas molecules by the filler. It is, more preferable to bake the panel out at a much lower temperautre, not only for the previously described reasons but also because lower temperatures will not affect the panel walls or the filler material when those materials are adversely affected by high temperatures. By means of the method of this invention, in relation to FIG. 1, the appendage member 15 may be heated to about 350° or higher to release large quantities of hydrogen gas to the interior space 13 of the panel. This heating may be accomplished in one example by means of an electrical heater 19 surrounding or adjacent appendage member 15 and connected to a suitable control, such as rheostat 20, and from there to a source of power 21, not shown. By this means, a large quantity of hydrogen is swept through the panel and evacuated by port 18. After evacuation the electrical heat source 19 is removed and any hydrogen left in the panel is re-absorbed by titanium hydride 17 to provide and maintain a high vacuum. Panel 10, therefore, need only be heated to a much lower temperature during the evacuation process and may, in some instances, not be heated at all.

In FIG. 3 of the drawing, appendage member 15 has been removed or eliminated to provide a smooth or generally flat surface for wall 10. In the assembly of panel 10, a metal hydride 17, for example, titanium hydride, is mixed with a suitable material, for example, cellulose nitrate and an amyl acetate solvent to provide a suitable mixture which is painted or otherwise placed on inner surface of the wall 10, generally at the opposite end from the evacuation port 18. A suitable strip, for example, a metal strip 22 is placed over the painted area to retain hydride 17 in position. Filler material 14 is then inserted between walls 10 and 11 to provide a panel which is thereafter sealed at its edges 12. The panel is baked out and evacuated while an additional heat source, for example, heater element 23 is applied in the same manner as heater 19 is applied to FIG. 1. After evacuation, port 18 is sealed off to provide a completed insulating panel.

In FIG. 4 of the drawing, a metallic hydride, for example titanium hydride, is decomposed and thereafter sealed in a thin wall tube, for example, glass tube 24 which is then inserted in appendage member 15. As in FIG. 1, the assembled panel is baked out and evacuated. After evacuation, port 18 is sealed in any suitable manner to provide a completed thermal insulating panel. Appendage 15 is then bent or collapsed to break or otherwise unseal tube 24 and expose the decomposed hydride to the interior of the panel. The decomposed hydride is capable of re-absorbing considerable quantities of hydrogen at room temperature throughout the life of the panel. The degree of re-absorption is obviously a function of the temperature used in decomposition. It is possible for hydrogen to diffuse through the metal walls of a vacuum insulated panel during the life-time thereof as the result of corrosion on the panel exterior which forms atomic hydrogen. Therefore hydrogen gas pressure builds up within the panel, and its high molecular thermal conductivity impairs the high insulating quantity of the vacuum structure. The decomposed metallic hydride absorbs any hydrogen which enters the panel to maintain a low thermal conductivity therethrough. The activated metallic hydride when used to evacuate the panel as described in FIG. 1 also performs the described purpose depending on the heating temperature employed.

It is to be understood that at the end of the evacuation process, as described for FIG. 1, appendage member 15 may be suitably removed from the panel or merely that the heater assembly adjusted to a cooler temperature or the circuit opened. Where the hydride source may be used for a series of panels, the completed panel may contain the decomposed source as illustrated in FIG. 4. The sealed source of FIG. 4 may also be employed for panels evacuated by other methods.

In FIG. 5 a vacuum or "Dewar" flask which is shown generally at 25 comprises an inner wall 26 and outer wall 27 to define an evacuated space 28. Walls 26 and 27 are joined in any suitable manner to provide a self-supporting structure. Appendage member 15 extends from wall 27 defining a chamber 16 which communicates with the evacuated space 28. Chamber 16 is filled with a metallic hydride 17, for example titanium hydride. If it is desired, a filler material 14 may be provided in one instance between the walls 26 and 27. Hydride 17 is heated to decompose at a temperature in the range of 350 to 700° to provide large quantities of pure hydrogen in space 28 to facilitate evacuation in the same manner as described for FIGS. 1 and 3.

The invention illustrated in FIGS. 1, 3 and 5 may also be employed to change, vary or otherwise regulate the conductivity or K value of the panel or structure, or the panel or structure may have a high or low resistivity to the passage of heat therethrough. A change in conductivity is obtained by means of the appendage member 15 containing hydride 17. Heating of the hydride will release large quantities of hydrogen into the interior of the panel and increase the heat transfer therethrough by gaseous conduction.

Before proceeding with the description of the insulating structure of this invention, it may be well to consider briefly the manner in which heat transfer may take place through a vacuum panel or structure of the preferred form of this invention. Such heat transfer takes place by means of gaseous conduction, radiation and solid conduction.

Gaseous conduction is heat tranfser from one molecule of gas to another. As the internal gas pressure within an evacuated space decreases, the heat transfer between gas molecules in the absence of conduction, remains nearly constant, until the mean free path of the gas molecules approach the pore size of the filler material. The gaseous conduction then decreases with pressure in approximately linear relationship until it becomes negligible, the remaining heat transfer being then substantially entirely affected by radiation and solid conduction in the filler material.

Heat transfer by radiation is greatest when the evacuated space is devoid of any filler material. In the case of the well known "Dewar Flask," heat radiation is reduced by providing reflective surfaces on the walls, for example, by silvering or alumunizing. However, where a filler material is employed as a structural element, as in the panel of the present invention, the filler material itself, if properly chosen, materially reduces the heat transfer by radiation.

Solid conduction is the heat transfer between spaced walls through the solid material within the space. Since most insulating structures are relatively sealed enclosures, variation of the conductivity by means of varying the solid conduction is a difficult if not impractical method. Furthermore, where most insulating panels or structures generally have or require a filler material, variation of heat conductivity by varying the filler material or reflective surfaces is also difficult if not impractical. It has been discovered that heat transfer by conduction may be effectively varied by varying the gas content of an evacuated structure. In one example of this invention the gas content is varied by introducing through special means in the structure, more or less of a particular gas. However, where an effective insulating panel or structure has a very low heat conductivity, such structures generally are evacuated, and to permit entry of a gas into the evacuated space and then to re-evacuate the space could be an uneconomical process. It has been discovered that a given evacuated panel structure of low heat conductivity may be made to have variable conductivity by introducing and absorbing a gas entirely within the structure, solely through means within the structure, and without need for re-evacuating the structure.

While it is noted that various materials may be employed which will release and absorb a given quantity of gas, it has been found that hydrogen is the more preferred gas to employ in this invention since the conductivity of hydrogen is greater than other known gases and because hydrides are able to release and absorb large quantities of hydrogen to effectively vary the conductivity over a wide range. As an example of the characteristics of a hydride to release the required amount of gas, attention is again directed to FIG. 2 where curve A represents the amount of hydrogen evolved from titanium hydride at a given temperature condition. This decomposition cycle is reversible, i.e., the hydride absorbs hydrogen upon cooling of the hydride, and appears to be repetitive indefinitely. The use, therefore, of hydrogen is exceptionally adaptable to the aforementioned evacuation process, as well as to the variable temperature feature without need of any further apparatus.

While this invention may be equally applied to any form or configuration of an insulated structure and filler, the description will proceed with, for example, a panel made in accordance with the aforementioned copending application of Strong and Bundy and illustrated in FIG. 1. Such an insulated panel filled with a glass fiber has a conductivity of about $8 \times 10^{-6}$ calories per centimeter per degree centigrade per second at 65° C. The K factor of conductivity is considerably reduced in that most of the gas or air is removed from the panel and the pore size between individual fiber strands is exceedingly small. Such a high vacuum and small pore size is generally required in order to provide a panel of the low heat conductivity as mentioned. This small pore size reduces the conductivity of the residual gas by making the spaces between the fibers smaller than the mean free path of the gas molecule. When this condition is reached, the gas conduction is proportional to the gas pressure. When a dense mat of fiber is used, residual gas conduction becomes very small at internal pressures of less than about 100 microns of mercury. When such a panel is filled with air, its conductivity increases by a factor of about 12. If the panel is filled with hydrogen, a much higher conductivity is possible because the thermal conductivity of hydrogen is $480 \times 10^{-6}$ calories per centimeter per degree centigrade per second, a value which is five times larger than that for air. Therefore, a panel filled with hydrogen should have the value of K for hydrogen in addition to that which is contributed by convection, solid conduction, and radiation.

That the thermal conductivity of a glass fiber filled vacuum insulation panel increases with the internal hydrogen pressure is adequately described in relationship with FIG. 8. In FIG. 8, curve A was calculated for variable hydrogen pressure in a panel filled with glass fibers averaging 15 microns in diameter giving an effective pore size of 33 microns. If fibers of larger or smaller diameter are employed, the conductivity increases or decreases accordingly and with a larger diameter fiber the conductivity increases more rapidly at lower pressures. By varying the hydrogen content of the panel, it is possible to vary its thermal conductivity from about $8 \times 10^{-6}$ to about $490 \times 10^{-6}$ calories per centimeter per degree centigrade per second. This is a theoretical range of 60 to 1. Accordingly, in one device, thermal conductivity in the widest range of gas conduction can be obtained. It was discovered that for flat panel insulation one gram of titanium hydride is generally sufficient to control 8 liters of panel volume.

It is contemplated that the hydride may be employed in a panel such as that shown in FIG. 1 where the appendage 15 contains a hydride and may be exposed to ambient temperatures where the ambient temperatures are sufficient to cause release of the hydrogen gas in the panel to change the conductivity. Alternatively, heat may be applied to appendage 15 by various heating means, external or internal, as where appendage 15 is in space 13 or the modification of FIG. 3 is employed with internal heating means. When electrical power was supplied to the heater element, of FIG. 1 for example, the titanium hydride 17 evolved large quantities of hydrogen which filled the panel and increased the panel conductivity of the structure as a whole. Results of such heating and practicability thereof are illustrated in FIGS. 6 and 8.

In FIG. 6, curve A illustrates the change of thermal conductivity of a panel made in accordance with the teachings of this invention where the panel contained four grams of titanium hydride 17 in a quartz container 29 (FIG. 9). The sharp rise of the gas evolution of the hydride is indicated between approximately 300 and 700° and the corresponding change in thermal conductivity is between 10 and about 500. The watts input for such a heater to control the conductivity of panels illustrated in FIG. 7 where the quartz tube 29 (FIG. 9) was filled with four grams of titanium hydride and a maximum power input of approximately 60 watts evolved about 1200 cc. of hydrogen.

One of the problems connected with the application of varying thermal conductivity is to provide an efficient method of heating the hydride. To be economical the transfer of heat to the panel should be obtainable with a small expenditure of energy in heating the hydride. The ratio of heat transferred to the panel compared with the amount of energy used in heating the hydride may be considered an amplification factor.

A quartz appendix was constructed having a relatively high efficiency, and giving the panel an amplification factor 40 to 1 with 100° F. temperature gradient across the panel. Referring now to FIG. 9, reentry quartz tube 29 contains titanium hydride powder 17 in the annular space 30. A resistance heater 31 is wound about a ceramic tube 32 and inserted in the inner cavity 33. Insulation 34 surrounding the outer tube 38 adds greatly to the heating efficiency. With a tube of this design, four grams of titanium hydrides generated enough hydrogen to give the maximum thermal conductivity in a one-half inch thick glass fiber filled evacuated panel having 30 square feet of area with only 60 watts of power necessary to heat this hydride. It is to be understood that the heater of FIG. 9 may be positioned externally to the structure as in FIG. 1 or that it may be internal so that insulation 34 represents the insulating filler in the panel. This requires only a slight modification of the exit 35 to be shortened to be within the structure.

The evolution of hydrogen when hydride is heated is practically instantaneous. Hydrogen gas diffuses into the panel rapidly so that in a period of a few minutes equilibrium gas pressure is obtained. When the hydride is cooled, the absorption of hydrogen takes place more slowly. In a large panel complete re-absorption to a pressure of 10 microns of mercury or less may take about 30 minutes. According to the low thermal diffusivity of insulation of this type, a longer time than this is required to reach steady state transfer through a panel. Therefore, the slow rate of absorption is not a serious problem. The rate of absorption of the released hydrogen may be increased by providing channels or other openings for the gas to diffuse through the panel or by placing the hydrides throughout the panel so as to have a maximum of surface area exposed to the free gas.

Various applications are contemplated for the use of such a panel or structure. Included among those applications are building insulation materials where the variable conductivity could be used in conjunction with the solar heating system to take advantage of the variation and incoming solar energy, or a variable conductivity structure such as the flask of FIG. 5. Variable thermal conductivity in the field of solar heating for buildings to obtain maximum heat transfer is employed when solar radiation is high and minimum heat loss with solar radiation is low. Panels may be installed in the roof of the building to permit escape of heat at night and prevent absorption of heat during the day. A further application may be obtained in defrosting home refrigerators or freezers since permitting the K value of a vacuum insulated freezer to increase would melt the frost from the inside walls.

The control necessary for varying or changing conductivity is well understood to those skilled in the art. Briefly, the heater element of FIGS. 1, 3 and 5 is energized at a predetermined conductivity K, for example, by having a temperature sensitive elemnt or probe within the panel to energize the heater at one conductivity level and to de-energize the heater at another. It is, of course, understood that the operations may be done manually or that the hydride could be heated by exposure to ambient conditions, for example, when used on high speed missiles, etc.

The upper limit of conduction may be in the range where heat transfer through the panel is not sufficient for some applications if thicker panels are used. Therefore as a modification of the glass fiber filled panel, it is possible to substitute a more conducting material for the filler. This raises the solid conductivity of the panel. The variable gas conductivity is still added as a parallel means of heat transfer to the panel. By a suitable choice of filler, it is possible to have a variable insulation in any conductivity range desired. The conductivity range possible for various fillers is shown in FIG. 10. As the conductivity is increased by using more conducting and various fillers, the percentage change in conductivity possible decreases. The only requirement in the choice of fillers is that they be compatible to being sealed in a permanently evacuated structure. Most metals and some ceramics are suitable and the form of material can be varied to get the desired amount of solid conduction.

As will be apparent to those skilled in the art, the objects of this invention are obtained by the use of a given material, for example, a hydrogen containing compound, preferably a metallic hydride, to be employed in an insulating structure to facilitate the evacuation by the release of hydrogen, to maintain evacuation by absorption of gases, and to vary the thermal conductivity thereafer by the further release and adsorption of hydrogen.

While other modifications of this invention and the variations of apparatus which may be employed within the scope of the invention have not been described, the invention is intended to include all such as may be embraced within the following claims.

What I claim as new and desire to secure by Letters Patent of the United States is:

1. A method of evacuating an insulating envelope structure having a pair of spaced apart walls with an insulating filler material therebetween which inhibits the movement of air molecules when evacuating the space between the walls, comprising the steps of, providing in communication with the interior of said structure a quantity of hydride, heating said structure, evacuating said structure, heating said hydride to a temperature in excess of the temperature of said structure to release hydrogen into said panel, continuing to evacuate said structure with released hydrogen therein, sealing said structure, and discontinuing heating said hydride for said hydride to absorb hydrogen gas in said panel.

2. The method of evacuating an insulating envelope structure comprising a pair of spaced apart walls with an insulating filler material therein which comprises the steps of, placing a sealed source of decomposed metallic hydride in communication with the interior of said structure, heating said structure, evacuating said structure, sealing said structure, and unsealing and exposing the decomposed source of hydrogen to the interior of said structure.

3. The method of evacuating an insulating envelope structure having a pair of spaced apart walls with an insulating glass fiber filler material therebetween which inhibits the movement of air molecules when evacuating the space between the walls, comprising the steps of, providing in communication with the interior of said structure a metallic hydride, heating said structure to a temperature of less than about 350° C., evacuating said structure, heating said hydride to a temperature of at least about 350° C. to release hydrogen into said panel, continuing to evacuate said structure with released hydrogen therien, sealing said structure, and discontinuing heating said hydride for said hydride to absorb hydrogen gas in said structure.

4. An insulating structure including a pair of walls defining a narrow space therebetween, the space between said walls being evacuated, a filler material in said space, said filler material comprising a body of fiber glass strands positioned in planes generally parallel to the said walls of said structure and a hydride in communication with said space adapted to release hydrogen upon a predetermined temperature rise to vary the conductivity through said panel.

5. The invention as claimed in claim 4 wherein said hydride is a metallic hydride.

6. An insulating structure comprising in combination, a pair of spaced apart walls sealed to provide a space therebetween which is evacuated, a hydride in communication with said space, means to heat said hydride in accordance to a predetermined thermal conductivity between said walls to provide hydrogen in said evacuated space to raise the thermal conductivity, and means to reduce said heating for said hydride to adsorb said hydrogen to lower the said thermal conductivity.

7. The invention as recited in claim 6 wherien said hydride is a metallic hydride.

8. The invention as recited in claim 7 wherein said hydride is at least one of the metallic hydrides taken from the class consisting essentially of titanium, zirconium, germanium, cerium, and barium.

9. The invention as described in claim 7 wherein said hydride is titanium.

References Cited by the Examiner
UNITED STATES PATENTS

| | | | |
|---|---|---|---|
| 2,175,579 | 10/39 | Stratton | 189—34 |
| 2,391,436 | 12/45 | Miskella | 189—34 |
| 2,439,604 | 4/48 | Heritage | 20—101 |
| 2,497,911 | 2/50 | Reilly et al. | 206—.4 XR |
| 2,528,547 | 11/50 | Reilly et al. | 206—.4 XR |
| 2,595,262 | 5/52 | Hood | 20—101 |
| 2,747,269 | 5/56 | Atchison | 29—455 |
| 2,824,364 | 2/58 | Bovenkerk | 29—455 |

RICHARD W. COOKE, Jr., *Primary Examiner.*

WILLIAM I. MUSHAKE, EARL C. DARSCH, JACOB L. NACKENOFF, *Examiners.*